Jan. 13, 1959 E. R. SCHMIDT 2,868,899
TELEPHONE SYSTEM SUBSCRIBER LINE INSULATION TESTING CIRCUIT
Filed June 19, 1957 3 Sheets-Sheet 1

INVENTOR.
EDWARD R. SCHMIDT
BY F. H. Henson
AGENT

Jan. 13, 1959 E. R. SCHMIDT 2,868,899

TELEPHONE SYSTEM SUBSCRIBER LINE INSULATION TESTING CIRCUIT

Filed June 19, 1957 3 Sheets-Sheet 2

INVENTOR.
EDWARD R. SCHMIDT
BY F. H. Henson
AGENT

INVENTOR.
EDWARD R. SCHMIDT
BY F. H. Henson
AGENT

United States Patent Office 2,868,899

Patented Jan. 13, 1959

2,868,899

TELEPHONE SYSTEM SUBSCRIBER LINE INSULATION TESTING CIRCUIT

Edward R. Schmidt, Rochester, N. Y., assignor to General Dynamics Corporation, Rochester, N. Y., a corporation of Delaware Application June 19, 1957, Serial No. 666,590

10 Claims. (Cl. 179—175.2)

Figure 1:
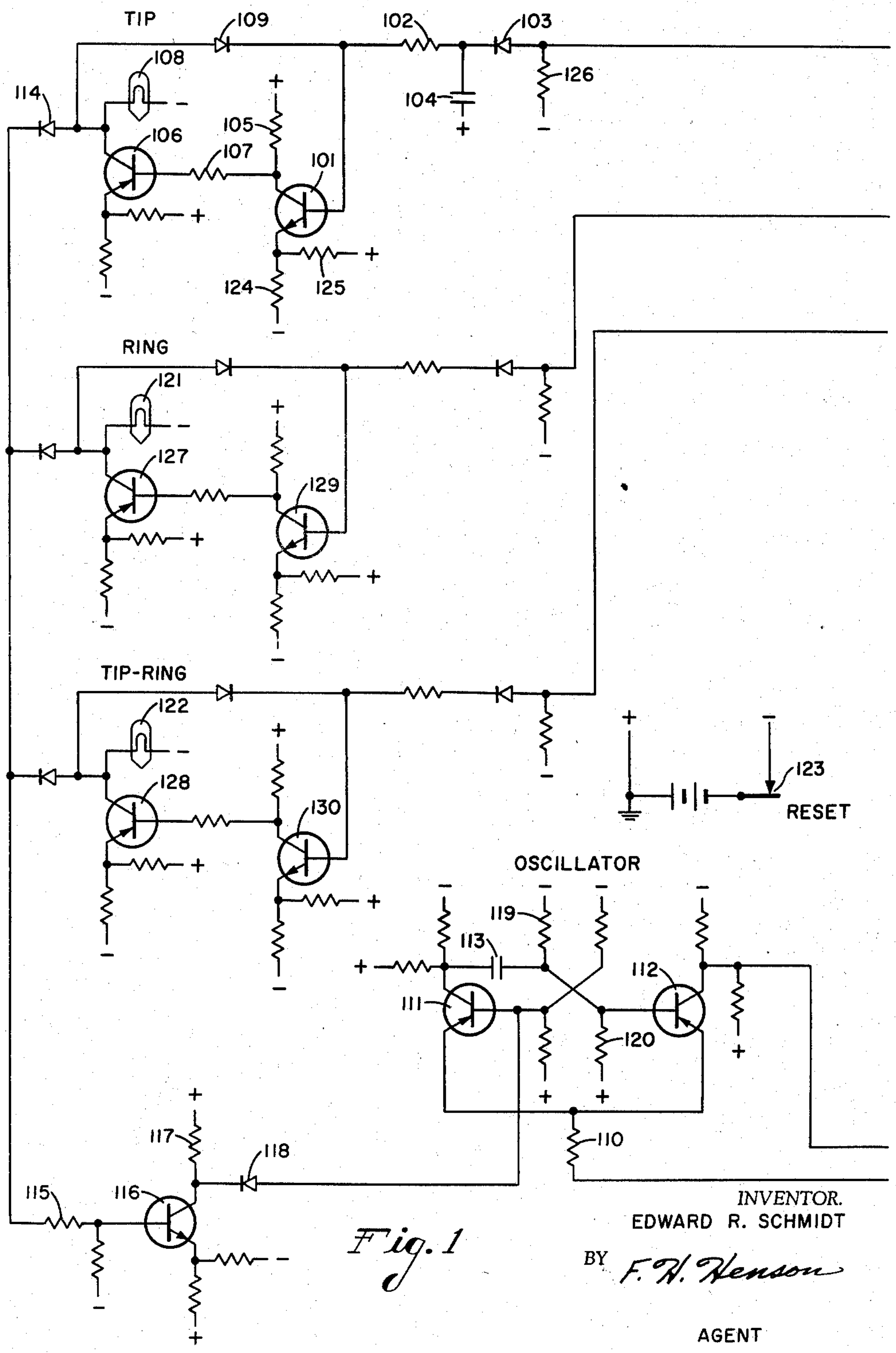

This invention relates in general to testing circuits and, more particularly, to circuits for testing the insulation on telephone system subscriber lines.

The routine testing of telephone system subscriber lines for low insulation resistance is a well known procedure. Conventionally, a telephone type relay is utilized for detecting insulation resistance below a predetermined value and electromechanical switches, or relays, are utilized to connect the detector relay to the individual line conductors and then across the line conductors in turn. Obtaining the precise adjustment required for the detector relay is, of course, a delicate and time consuming operation and the electromechanical equipment is subject to the inherent limitations of physical size and maintenance problems.

Accordingly, it is the general object of this invention to provide a new and improved testing circuit for testing the insulation on telephone subscriber lines.

It is a more particular object of this invention to provide a new and improved telephone subscriber line insulation testing circuit which comprises transistors rather than the conventional relays and electromechanical switches.

In accordance with the present invention, the testing circuit comprises a plurality of transistor bi-stable trigger circuits, one for each of a predetermined number of fault conditions. Stepping means, which comprises an oscillator driven, tandem connected, flip-flop chain, is provided for controlling a plurality of transistor switches to connect the input circuit of each trigger circuit to the line in turn. The trigger circuits are normally operated to their first operated condition and a particular trigger circuit is triggered to its second operated condition only when its input circuit is connected to the line under test and only if the respective one of said faults exists on said line.

In the disclosed system, three trigger circuits are provided and the input circuits of the three trigger circuits are connected in turn to the tip, ring, and tip conductors of the line to test for leakage from tip to ground, leakage from ring to ground, and leakage between the tip and ring conductors, respectively. Simultaneously with the connection of the third trigger circuit to the tip conductor, the testing circuit applies ground potential to the ring conductor for the purpose of supplying an operating potential for the third trigger circuit if the leakage resistance between tip and ring is below a predetermined value. If any one of the trigger circuits is triggered to its second operated condition, thus indicating that the respective fault exists on the line under test, the operation of the oscillator is terminated so that no further tests are made on the line and a lamp associated with the output circuit of that trigger circuit is illuminated to identify the fault existing on the line. The test operator may then make a meter test of the line to determine the exact value of the leakage resistance with meter equipment provided in the testing circuit.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise four figures on three sheets and which are to be arranged in numerical order from left to right.

Figure 2:
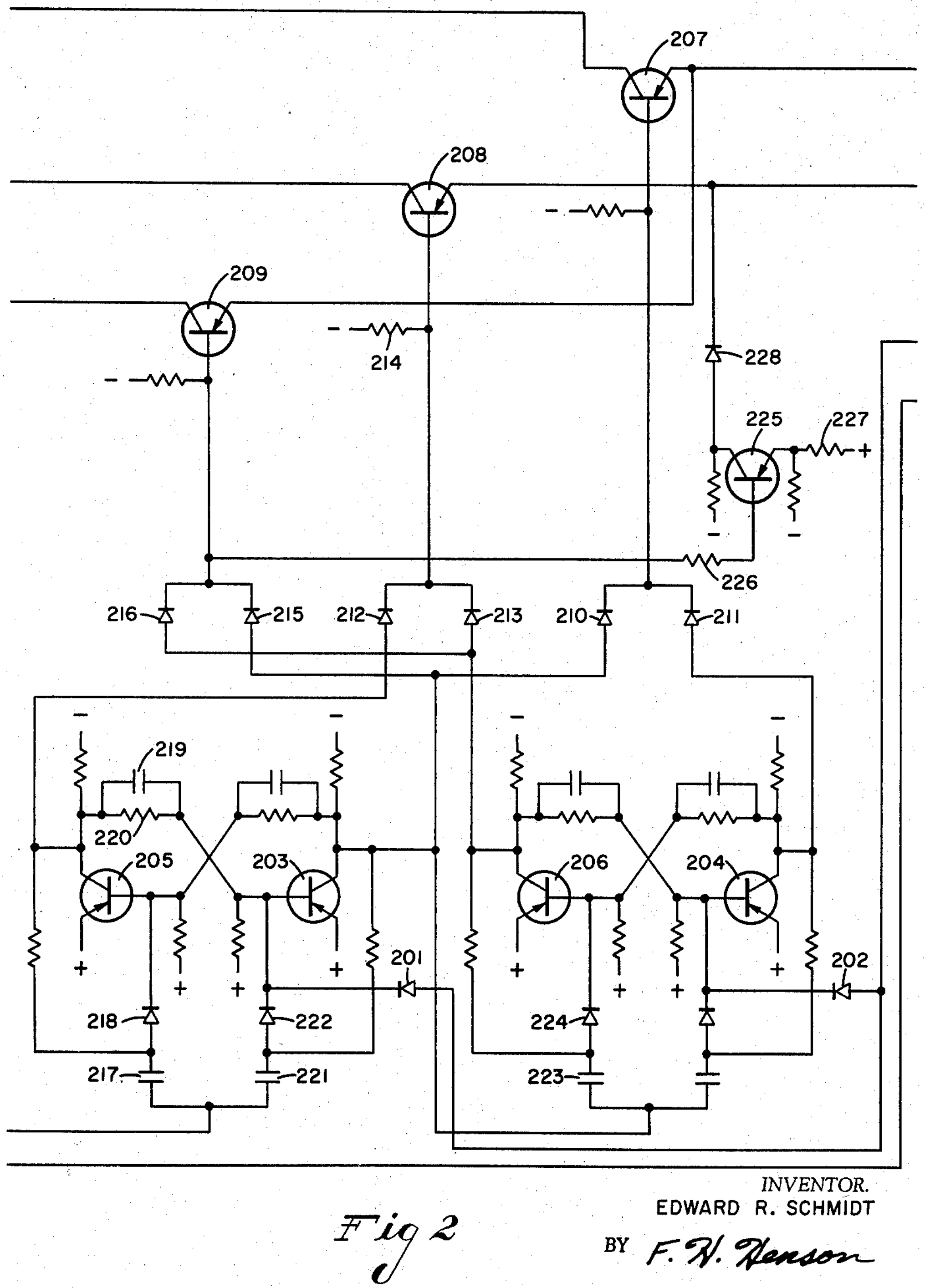
Figures 3, 4:
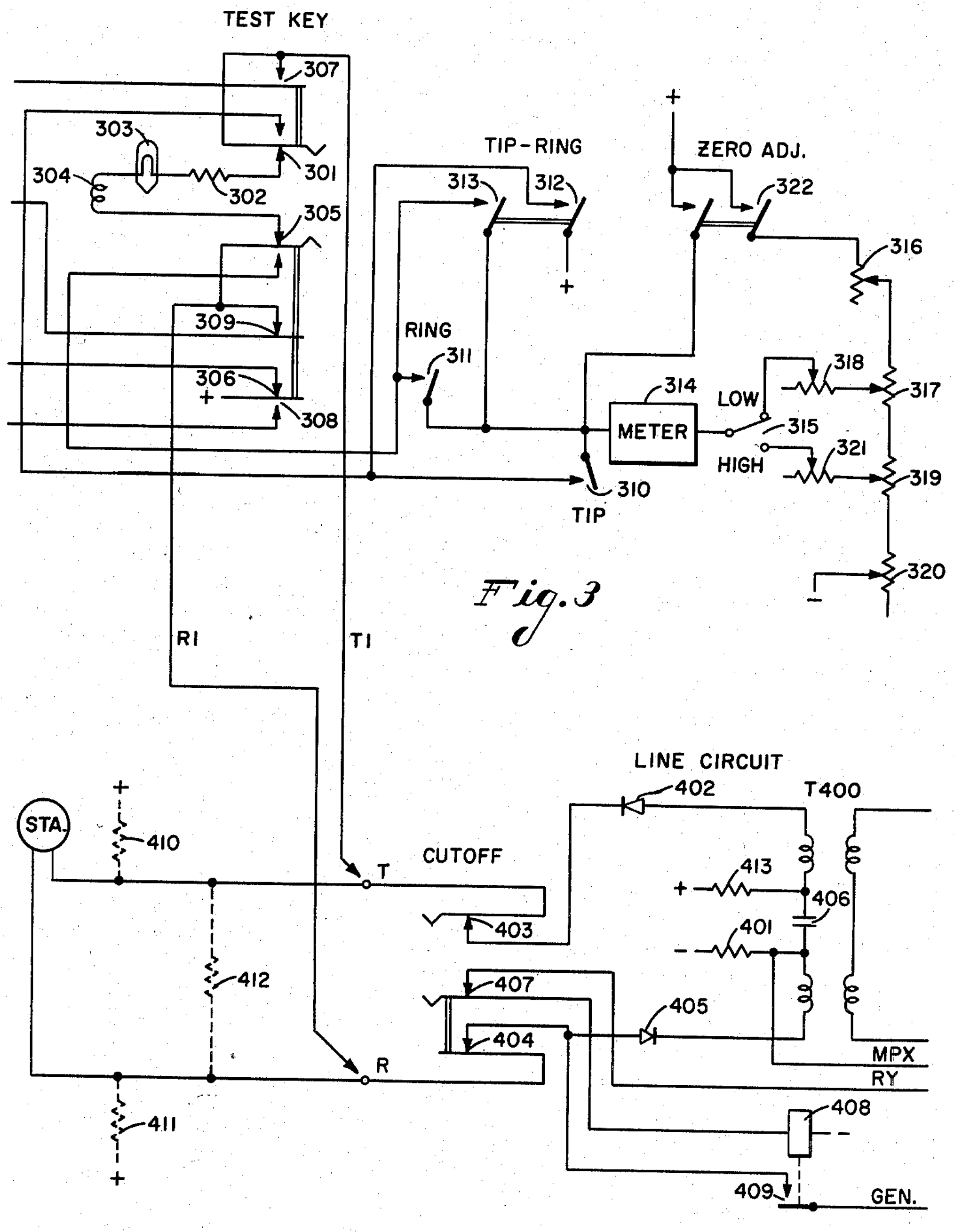

Figs. 1–3, inclusive, show the circuit details of a telephone system subscriber line insulation testing circuit, and Fig. 4 shows a portion of the line circuit of an electronic switching telephone system of the type shown and described in Trousdale Patent 2,830,120, which is assigned to the same assignee as the present invention.

Before proceeding to describe the operation of the testing circuit, it is believed desirable to first describe the operation of the line circuit of Fig. 4. As stated above, the electronic switching telephone system, of which the illustrated line circuit is a part, is fully disclosed in the above-identified patent. That system is of the bi-path type and has separate supervisory and talking paths. The supervisory path is controlled on a time-sharing, or time-division multiplex basis, and the communication paths between calling and called lines are closed through semiconductor switches for the duration of a call. It can be seen that when the illustrated subscriber station is on-hook, line current does not flow and the potential appearing across supervisory resistor 401, and which is applied to multiplexer conductor MPX, stands at the potential of the negative terminal of the battery, which is minus forty-eight volts in conventional telephone systems.

When the illustrated subscriber station goes off-hook, line current flows from ground, through resistor 413, the upper primary winding of transformer T400, diode 402, contacts 403 of the cut-off key, through the loop circuit closed at the station, through contacts 404 of the cut-off key, diode 405, the lower primary winding of transformer T400, and through resistor 401 to battery. Due to the voltage drop across supervisory resistor 401, the potential of conductor MPX rises to a more positive value than minus forty-eight volts and the line circuit is marked as being in the calling condition. The potential of conductor MPX returns to minus forty-eight volts during each dial impulse and register equipment associated with the supervisory path is controlled by the repeated dial impulses to register the designation of the called line. Voice signals appearing on the illustrated line are coupled through transformer T400 and through the voice switches associated with the illustrated line and the called line to the called line. Similarly, voice signals originating on the called line are coupled through the voice switches and through transformer T400 to the illustrated line. Capacitor 406 serves to bypass supervisory resistor 401 for voice signals but allows dial impulses to appear across said resistor.

When the illustrated line is the selected called line, ground potential applied to conductor RY by a ringing control circuit is coupled through contacts 407 to operate ringing relay 408. At its operated contacts 409, relay 408 applies ringing current appearing on conductor GEN through contacts 404 to conductor R to actuate the ringer at the illustrated station. When the called party answers, loop current flows, a voltage drop appears across supervisory resistor 401, and ringing is tripped, all as fully described in the above-identified patent. A cut-off key is provided in the line circuit since the electronic switching system may be used on shipboard and it is desirable to disconnect battle damaged lines from the switchboard.

As illustrated, the subscriber line is subject to the fault conditions of leakage from the tip conductor to ground through resistor 410, leakage from the ring conductor to ground through resistor 411, and leakage between the tip and ring conductors through resistor 412. If the resistance value of any one of the illustrated leakages should be below a certain predetermined value, distortion of dial impulses and interference with conversation may occur.

The illustrated testing circuit, which is intended as an example only, is portable and the tip and ring conductors T1 and R1 associated with the testing circuit are either plugged into a jack associated with the line to be tested or are clipped to terminals associated with that line at the line terminal block. Before proceeding to test the line, an observation is made to determine if the line is in use. For this purpose, a high resistance loop is closed from conductor T1, through contacts 301 of the test key, resistor 302, lamp 303, inductor 304, contacts 305 of the test key to conductor R1. If the line is not in use, lamp 303 is illuminated from ground and battery through battery feed resistors 413 and 401, respectively. However, if the station on the line is off-hook, the lamp circuit is shunted by the relatively low resistance of the station transmitter and receiver and lamp 303 is not illuminated. If the line is idle, the test operator operates the cut-off key associated with the line circuit to effectively isolate the line to be tested from the line circuit.

Means is provided in the circuit for assuring that the tests will be performed in a predetermined order. For this purpose, ground is applied through break contacts 306 of the test key and through diodes 201 and 202 to the base electrodes of transistors 203 and 204, respectively. Under these conditions, transistors 203 and 204 are held non-conductive and transistors 205 and 206 are biased for conduction due to the negative potential appearing at the collector electrodes of transistors 203 and 204, respectively. The collector electrode potentials of transistors 203, 204, 205 and 206, are gated together in unique combinations for the purpose of controlling the conductivity of the transistor switches 207, 208 and 209 on a one at a time basis. It can be seen that the collector electrodes of transistors 203 and 204 are connected to the anode terminals of diodes 210 and 211, which diodes form an "and" gate for negative signals. Since transistors 203 and 204 are non-conductive and their collector potentials stand at minus forty-eight volts at this time, the base of transistor 207 stands at minus forty-eight volts. Similarly, the collector electrodes of transistors 205 and 206 are connected to the anode terminals of diodes 212 and 213, respectively, and the base of switching transistor 208 is held at ground potential by virtue of the conduction through the diodes and through resistor 214 to minus forty-eight volts. The collector electrodes of transistors 203 and 206 are connected to the anode terminals of diodes 215 and 216 and because of the conduction through diode 216, diode 215 is blocked and the base of transistor 209 is also held at ground potential. Thus, transistor 207 is enabled for conduction and transistors 208 and 209 are biased for non-conduction prior to the operation of the test key.

When the test key is operated, the emitter electrodes of transistors 207 and 209 are connected through contacts 307 to tip conductor T1 and thus to the tip conductor of the line. If the resistance of leakage resistor 410 is less than a predetermined value, the conduction of enabled transistor 207 is of sufficient magnitude to render transistor 101 of the tip trigger circuit conductive since its base electrode is coupled to the collector electrode of transistor 207 through resistor 102 and diode 103. Bypass capacitor 104 is provided in the base circuit of transistor 101 for the purpose of preventing transient potentials appearing on the line from rendering transistor 101 conductive.

If it be assumed that a fault exists on conductor T and transistor 101 is therefore rendered conductive, the potential across load resistor 105 in the collector circuit of transistor 101 drops to a negative value and transistor 106 is rendered conductive through base resistor 107. The resulting positive going potential at the collector of transistor 106 serves to illuminate lamp 108 and thus identify the fault as a leak from tip to ground. This positive going potential is also coupled through diode 109 to the base of transistor 101 and serves to hold the transistor conductive.

When the test key is first operated, ground potential through contacts 306 is removed from the base electrodes of transistors 203 and 204 but these transistors remain non-conductive because of the cross-coupling to the collector electrodes of conducting transistors 205 and 206, respectively. Ground is now applied through contacts 308 and common emitter resistor 110 to the emitter electrodes of transistors 111 and 112, which are connected in a free running multivibrator configuration. When ground is applied to the emitter electrodes, transistor 111 first becomes conductive since the positive going swing at the collector of transistor 111 is coupled through capacitor 113 to hold transistor 112 non-conductive. If it be assumed that the tip trigger circuit comprising transistors 101 and 106 was triggered to its second operated condition as previously described when the test key was operated, further operation of the oscillator is prevented and the tandem connected frequency divider circuits remain in a setting which enables switching transistor 207. This is accomplished by the coupling of the positive going potential appearing at the collector of transistor 106 through diode 114 and resistor 115 to the base of inverter amplifier transistor 116. When transistor 116 becomes conductive, the resulting negative potential appearing across load resistor 117 in its collector circuit is coupled through diode 118 to the base of oscillator transistor 111 and thus holds transistor 111 conductive.

If it be assumed that a fault does not exist on the tip conductor and that the tip trigger circuit is therefore not triggered to its second operated condition, capacitor 113 continues to discharge toward the voltage division across resistors 119 and 120 until transistor 112 starts toward conduction. Because of the common emitter connection, a negative pulse is applied to the emitter of transistor 111 to start transistor 111 toward non-conduction when transistor 112 starts toward conduction and the resulting negative swing at the collector of transistor 111 is coupled through capacitor 113 to aid in the build-up to saturation of transistor 112. As capacitor 113 continues to charge, the base and emitter of transistor 112 and the emitter of transistor 111 become more positive until a point is reached at which transistor 111 again starts toward conduction and transistor 112 is rendered non-conductive. Each time that transistor 112 becomes conductive and its collector potential rises toward ground potential, the first flip-flop circuit is triggered from one condition to the other. For example, on the first operation of transistor 112, the leading edge of the positive going pulse at its collector is coupled through capacitor 217 and steering diode 218 to the base of transistor 205 to render transistor 205 non-conductive. Because of the cross-coupling through capacitor 219 and resistor 220, transistor 203 becomes and is held conductive.

When transistor 203 becomes conductive, the resulting positive swing at its collector is coupled through capacitor 223 and steering diode 224 to the base of transistor 206 to render transistor 206 non-conductive. The resulting negative swing at the collector of transistor 206, of course, renders transistor 204 conductive. Switching transistor 207 is now disabled by ground potential coupled from the collector electrodes of transistors 203 and 204 through diodes 210 and 211, respectively, to its base electrode. Ring switching transistor 208 is now enabled since both transistors 205 and 206 are non-conductive and the input circuit of the ring trigger circuit is now connected through transistor 208 and contacts 309 to conductor R1 and thus to the ring conductor of the line. If the resistance of leakage resistor 411 is sufficiently low and the conduction of transistor 208 is therefore sufficiently great, the ring trigger circuit will be triggered to its second operated condition to illuminate lamp 121 and block further operation of the oscillator in the exact same manner as described for the operation of the tip trigger circuit. If the ring trigger circuit does not trigger to its second operated condition, the oscillator continues to operate and upon the next positive going pulse from transistor 112, transistor 203 is rendered non-conductive through capacitor 221 and diode 222 and transistor 205 is rendered conductive.

Ring switching transistor 208 is now disabled by ground potential coupled from the collector of transistor 205 through diode 212 to its base electrode and tip switching transistor 207 remains disabled because of the conduction of transistor 204. Tip-ring switching transistor 209 is now enabled since both transistors 203 and 206 are non-conductive. Transistor 225 is also rendered conductive at this time since its base electrode is connected through resistor 226 to the output of the "and" gate which controls switching transistor 209. Ground potential on resistor 227 is coupled through conducting transistor 225, diode 228, and contacts 309 to the ring conductor, through leakage resistor 412 to tip conductor T1, and through contacts 307 to the emitter electrode of transistor 209. If the resistance value of leakage resistor 412 is below a predetermined value, the tip-ring trigger circuit will trigger to its second operated condition to illuminate lamp 122 and terminate the operation of the oscillator in the exact same manner as described for the tip trigger circuit. If the tip-ring trigger circuit does not trigger to its second operated condition, the tests are repeated until the test key is restored.

If one of the lamps 108, 121, or 122 should become illuminated during the course of the test, the test operator operates the appropriate toggle switch, either tip switch 310, ring switch 311, or tip-ring switches 312 and 313, to connect the appropriate conductor with the ohmmeter circuit of Fig. 3. By means of the meter 314, the exact resistance of the leakage resistance can be determined. The meter circuit comprises a high-low scale switch 315 and resistors 316–322, inclusive. The various slide-wire resistors are used in conjunction with the zero adjust key 322 for initially calibrating the meter in the well known manner.

When the tests on a particular line have been completed, the test operator restores the test key to normal, restores the cut-off key of the particular line to normal, and then connects conductors T1 and R1 to the next line to be tested. If one of the trigger circuits operates during the test cycle, it is necessary to momentarily operate the re-set toggle switch 123 to remove battery potential from the negative bus and thus render all conductive transistors non-conductive.

As used in this circuit, transistors 111, 112, 203–209, and 225 may be type 4JD1A60, transistors 106, 127, and 128 may be type 4JD1A61, and transistors 101, 116, 129, and 130 may be type GT908. Also if it is desired that the trigger circuits be triggered on all values of leakage resistance below 50K ohms, the test circuit resistors 102, 124, 125, and 126 have respective resistance values of 10K ohms, 3.6K ohms, 10K ohms, and 100K ohms.

While there has been shown and described what is at present considered to be the preferred embodiment of the invention, modifications thereto will readily occur to those skilled in the art. It is not desired, therefore, that the invention be limited to the arrangement shown and described, and it is intended in the appended claims to cover all such modifications as fall within the true spirit and scope of the invention.

What is claimed is:

1. In a telephone system, a subscriber line subject to a plurality of fault conditions, a testing circuit comprising a plurality of transistor trigger circuits, one for each of said fault conditions, each of said trigger circuits having first and second stable states of operation, an input circuit and an output circuit for each trigger circuit, stepping means for connecting the input circuit of each trigger circuit to said line in turn, means responsive to the connection of the input circuit of each trigger circuit to said line when the respective one of said faults exists on said line for triggering that trigger circuit to its second operated condition, means responsive to the operation of any one of said trigger circuits to its second operated condition for terminating the operation of said stepping means, and indicating means connected in the output circuit of each trigger circuit for indicating the operated condition of that trigger circuit.

2. In a telephone system, a subscriber line subject to a plurality of fault conditions, a testing circuit comprising a plurality of transistors, one for each of said fault conditions, each of said transistors having input, output, and common electrodes, stepping means for connecting the input electrode of each of said transistors to said line in turn, means for biasing the input and common electrodes of each transistor for conduction only when the input electrode of that transistor is connected to said line and only if the respective one of said fault conditions exists on said line, means responsive to the conduction of any one of said transistors for terminating the operation of said stepping means, and means connected to the output electrode of each transistor for indicating the conductive condition of that transistor to thereby identify a fault existing on said line.

3. In a telephone system, a subscriber line, a circuit for testing said line for a predetermined number of fault conditions, said circuit comprising a plurality of testing means, one for each of said fault conditions, each of said testing means comprising a transistor having emitter, collector, and base electrodes, stepping means for connecting the base electrode of each of said transistors to said line in turn, means for biasing the base and emitter electrodes of each transistor for conduction only when the base electrode of that transistor is connected to said line and only if the respective one of said fault conditions exists on said line, means responsive to the conduction of any one of said transistors for terminating the operation of said stepping means, and means in the collector circuit of each transistor for indicating the conductive condition of that transistor to thereby identify a fault existing on said line.

4. In a telephone system, a subscriber line subject to a plurality of fault conditions, a testing circuit comprising a plurality of testing means, one for each of said fault conditions, each testing means comprising first and second transistors, means responsive to the existence of a fault on said line for rendering conductive the first transistor in the respective one of said testing means, means responsive to the conduction of said first transistor in each testing means for rendering conductive the second transistor in that testing means, means responsive to the conduction of said second transistor for holding said first transistor conductive, and means for indicating the conductive condition of the first and second transistors in each testing means to thereby identify the particular fault existing on said line.

5. In a telephone system, a subscriber line having tip and ring conductors, said line being subject to leakage to ground from said tip conductor, leakage to ground from said ring conductor, and leakage between said tip and ring conductors, a testing circuit comprising first, second, and third transistors each having input, output, and common electrodes, stepping means in said testing circuit for individually connecting the input electrodes of said first, second, and third transistors to said tip, ring, and to one of said tip and ring conductors, respectively, in a particular sequence, means in said testing circuit for applying ground potential to the other one of said conductors simultaneously with the connection of the input electrode of said third transistor to said one conductor, means for biasing the input and common electrodes of each transistor for conduction only when that input electrode is connected to a line conductor and only when the respective leakage resistance is less than a predetermined value, means responsive to the conduction of any one of said transistors for terminating the operation of said stepping means, and means connected to the output electrode of each transistor for indicating the conductive condition of that transistor to thereby identify a fault existing on said line.

6. The system of claim 5 in which said input, output, and common electrodes are base, collector, and emitter electrodes, respectively.

7. In a telephone system, a subscriber line having tip and ring conductors, said line being subject to leakage to ground from said tip conductor, leakage to ground from said ring conductor, and leakage between said tip and ring conductors, a testing circuit comprising first, second, and third transistor trigger circuits having first and second stable conditions of operation, stepping means in said testing circuit for connecting the input circuits of said first, second, and third trigger circuits to said tip, ring, and to one of said tip and ring conductors, respectively, in a particular sequence, means in said testing circuit for applying ground potential to the other one of said conductors simultaneously with the connection of the input circiut of said third trigger circuit to said one conductor, means responsive to the connection of the input circuit of each trigger circuit to a line conductor when the respective one of said faults exists on said line for triggering that trigger circuit to its second operated condition, means responsive to the operation of any one of said trigger circuits to its second operated condition for terminating the operation of said stepping means, and indicating means connected in the output circuit of each trigger circuit for indicating the operated condition of that trigger circuit.

8. In a telephone system, a subscriber line subject to a plurality of fault conditions, a testing circuit comprising a plurality of trigger circuits, one for each of said fault conditions, each of said trigger circuits having first and second stable states of operation, an input circuit and an output circuit for each trigger circuit, a plurality of switching transistors equal in number to said trigger circuits, each of said transistors having base, emitter, and collector electrodes, means for individually connecting the input circuit of each of said trigger circuits to the collector of one of said transistors, means for connecting the emitter electrodes of said transistors to said line, stepping means for applying an operating potential to the base electrodes of said transistors in a particular sequence, each of said trigger circuits being triggered to its second operated condition only when the transistor to which its input circuit is connected has an operating potential applied to its base electrode and only if the respective fault exists on said line, and means responsive to the operation of any one of said trigger circuits to its second operated condition for terminating the operation of said stepping means.

9. In a telephone system, a subscriber line subject to a plurality of fault conditions, a testing circuit comprising a plurality of first transistors, one for each of said fault conditions, each of said first transistors having input, output, and common electrodes, a plurality of switching transistors equal in number to said first transistors, each of said switching transistors having base, emitter, and collector electrodes, means for individually connecting the input electrode of each of said first transistors to the collector electrode of one of said switching transistors, means for connecting the emitter electrodes of said switching transistors to said line, stepping means for applying an operating potential to the base electrodes of said switching transistors in turn, means for biasing each of said first transistors for conduction only when the switching transistor to which that first transistor's input electrode is connected has operating potential applied to its base electrode and only if the respective fault exists on said line, means responsive to the conduction of any one of said first transistors for terminating the operation of said stepping means, and means connected to the output electrode of each first transistor for indicating the conductive condition of that transitsor to thereby identify a fault existing on said line.

10. In a telephone system, a subscriber line having tip and ring conductors, said line being subject to leakage to ground from said tip conductor, leakage to ground from said ring conductor, and leakage between said tip and ring conductors, a testing circuit comprising first, second, and third trigger circuits having first and second stable conditions of operation, first, second, and third transistors each having base, emitter, and collector electrodes, means for connecting the input circuits of said first, second, and third trigger circuits to the collector electrodes of said first, second, and third transistors, respectively, means for connecting the emitter electrode of said first transistor to said tip conductor, means for connecting the emitter electrode of said second transistor to said ring conductor, means for connecting the emitter electrode of said third transistor to one of said tip and ring conductors, stepping means for applying an operating potential to the base electrodes of said transistors in a particular sequence, means for applying ground potential to the other one of said tip and ring conductors simultaneously with the application of operating potential to the base electrode of said third transistor, each of said trigger circuits being triggered to its second operated condition only when the transistor to which its input circuit is connected has an operating potential applied to its base electrode and only if the respective fault exists on said line, and means responsive to the operation of any one of said trigger circuits to its second operated condition for terminating the operation of said stepping means.

References Cited in the file of this patent

UNITED STATES PATENTS 2,755,345 Vaupel ---------------- July 17, 1956